United States Patent [19]
Garnier

[11] 4,218,715
[45] Aug. 19, 1980

[54] MAGNETIC HEAD SLIDER ASSEMBLY

[75] Inventor: Michael F. Garnier, San Jose, Calif.

[73] Assignee: International Business Machines Corporation, Armonk, N.Y.

[21] Appl. No.: 19,952

[22] Filed: Mar. 12, 1979

[51] Int. Cl.² .................... G11B 5/60; G11B 5/22; G11B 21/20
[52] U.S. Cl. ................................ 360/103; 360/122
[58] Field of Search ............ 360/102, 103, 128, 129, 360/122; 308/9

[56] References Cited

U.S. PATENT DOCUMENTS

| | | | |
|---|---|---|---|
| 3,528,067 | 9/1970 | Linsley et al. | 360/103 |
| 3,573,768 | 4/1971 | Harris | 360/103 |
| 3,855,625 | 12/1974 | Garnier et al. | 360/103 |
| 3,893,185 | 7/1975 | Ring et al. | 360/103 |
| 3,956,770 | 5/1976 | McWhinnie et al. | 360/103 |
| 4,034,412 | 7/1977 | Smith | 360/103 |
| 4,081,846 | 3/1978 | Roscamp et al. | 360/103 |

*Primary Examiner*—Alfred R. Eddleman
*Attorney, Agent, or Firm*—Nathan N. Kallman

[57] ABSTRACT

A self-loading slider for a magnetic head assembly is formed with an air bearing surface having spaced rails and a negative pressure region between the rails. Shallow recesses or reliefs are formed in the rails so that ambient pressure is substantially maintained in the areas of such recesses along the rails. The slider is relatively insensitive to skew and disk curvature due to flutter or static deformation.

7 Claims, 3 Drawing Figures

U.S. Patent  Aug. 19, 1980  4,218,715
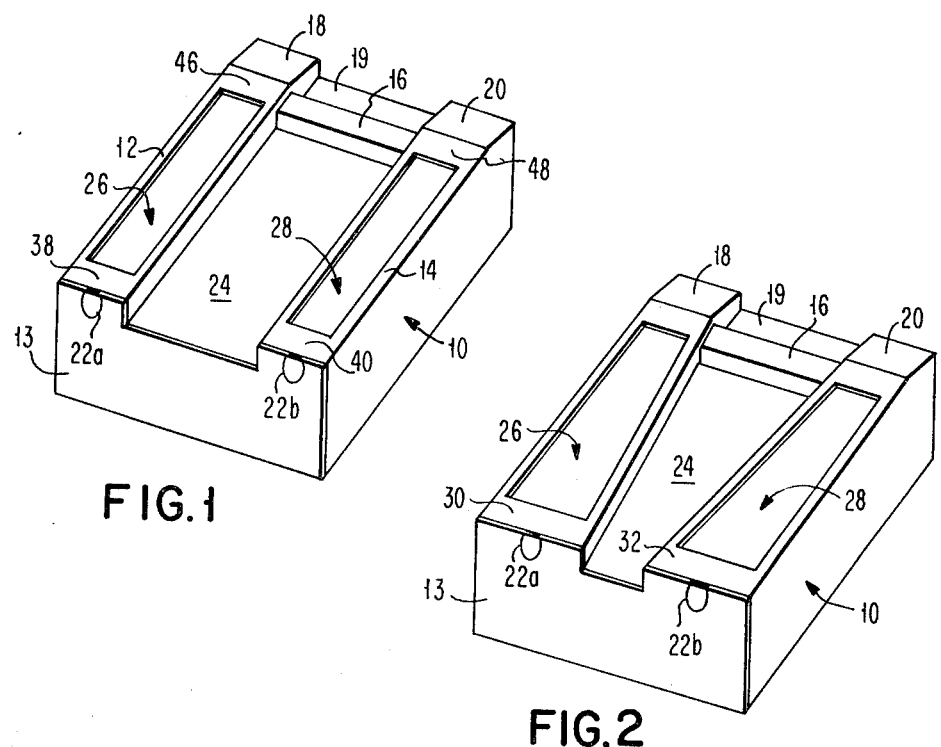
FIG.1
FIG.2
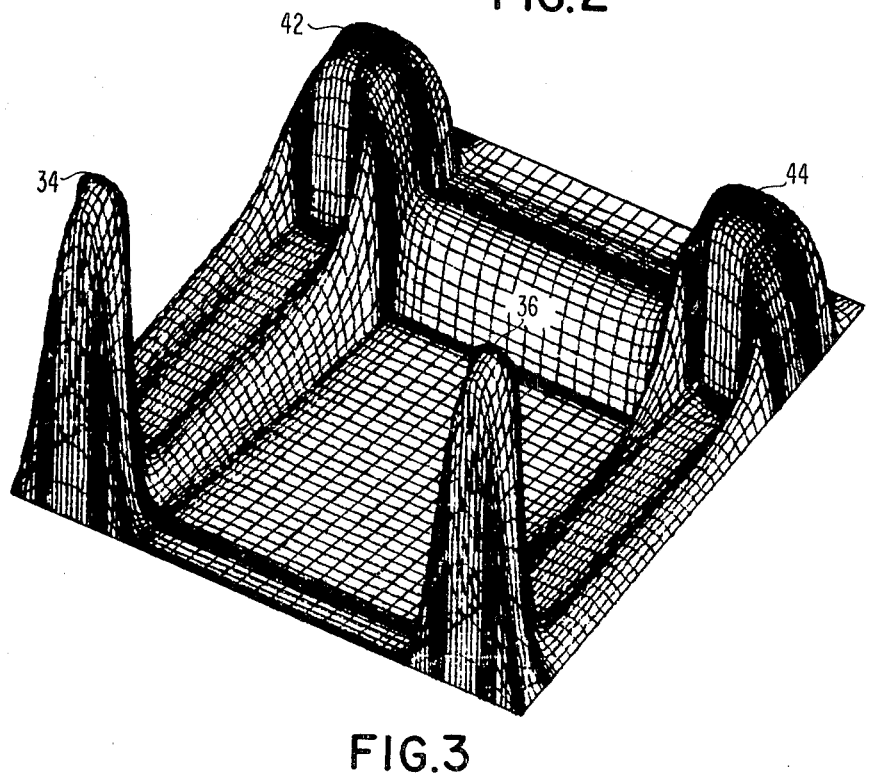
FIG.3

MAGNETIC HEAD SLIDER ASSEMBLY

CROSS-REFERENCE TO RELATED PATENT

U.S. Pat. No. 3,855,625, issued Dec. 17, 1974, to M. F. Garnier et al, describes a magnetic head slider assembly having flat outer rails and a cross rail. The present invention is a modification and improvement of the patented slider assembly.

DESCRIPTION

Technical Field

This invention relates to a self-loading magnetic head slider assembly.

An object of this invention is to provide a novel and improved air bearing slider for a flying magnetic head assembly that maintains a substantially constant spacing relative to a moving magnetic medium during transducing operation.

Another object is to provide a head slider assembly that is insensitive to skew and disk curvature or flutter and has a high degree of bearing stiffness while employing a low load.

BACKGROUND OF THE INVENTION

Magnetic head assemblies that fly relative to magnetic media have been used extensively. The objectives for improving the noncontact transducing relationship between a magnetic transducer and a magnetic recording medium, such as a rotary disk, are to attain very close spacing between the transducer and the disk, and to mantain a stable constant spacing. The close spacing, when used with very narrow transducing gaps and very thin magnetic record films, allows short wavelength, high frequency signals to be recorded, thereby affording high density, high storage capacity recording. As the data recording technology progresses, it becomes more desirable to fly magnetic heads more closely to the magnetic disk surface in order to increase data packing density.

BRIEF DESCRIPTION OF THE DRAWING

The invention will be described in greater detail with reference to the drawing in which:

FIG. 1 is an isometric view of a magnetic head slider, made in accordance with this invention, as viewed from the trailing edge and at the air bearing surface;

FIG. 2 is an isometric view of an alternative configuration, in accordance with this invention; and FIG. 3 is a representation of a pressure profile indicating the distribution of pressure, as measured along the air bearing surface of the slider.

DISCLOSURE OF THE INVENTION

In a preferred embodiment of the invention as illustrated in FIG. 1, an air bearing head slider is formed from a substantially rectangular block 10 made of ceramic, by way of example. The slider may be configured with an air bearing surface that is flat, taper-flat, or other variations of geometry. The slider configuration has two spaced side rails 12 and 14 and a cross-rail 16. The leading portion of each rail 12 or 14, relative to a moving data track, is formed as tapered sections 18 and 20 respectively. Between the tapered sections and at the leading end of the slider adjacent to the cross rail 16, a recessed step 19 is configured.

Magnetic transducer elements 22a, 22b, which may be thin film assemblies, are bonded to the ends of the rails 12 and 14 at the trailing end 13 of the slider relative to the path of movement of the data tracks as found for example on a rotating magnetic disk (not shown). The transducing gaps of the elements 22a,b are flush with the surface of the side rails 12 and 14. The slider assembly, when it is urged by a load means toward the surface of a rotating magnetic disk, establishes a thin air lubricating film which separates the gaps of the transducer elements from the disk by a very small, but constant distance.

In keeping with this invention, a negative pressure zone 24 is formed by the configuration of the side rails and cross-rail. The negative pressure zone is made in the recessed region following the cross-rail 16 and between the two side rails 12 and 14 to the same depth as the step 19, which may be in the order of 10 microns.

To provide optimum opposing load forces, and to realize mechanical stability with insensitivity to skew and disk curvature or flutter while preserving high stiffness, reliefs or recessed areas 26 and 28 are formed on the exposed surfaces of the side rails and at the air bearing surface of the slider. The recesses 26 and 28 are formed, by etching for example, to a depth in the side rails which produces a condition of essentially ambient or slightly subambient pressure across the side rails in the recess areas 26, 28 during flying operation of the head slider. The recesses 26, 28 are preferably formed to a depth in the range of 0.5 to 3 microns. The cross-rail 16 may also be relieved to the same depth as the recesses below the surface of the side rails, during the same fabrication step.

Since the average pressure across the side rails is essentially ambient or slightly subambient, the slider is relatively insensitive to local slider-disk spacing variations caused by disk curvature or flutter. In the case of a slider that is skewed relative to the path of motion of a data track, the air bearing is not diminished by side flow from the side rails, since a minimized pressure gradient exists in the transverse direction between the center of the side rails and the outer boundaries of the side rails.

In an alternative embodiment, as illustrated in FIG. 2, the side rails 30 and 32 are formed as trapezoidal type sections, so that the side rails flare towards the negative pressure zone 24 as they progress towards the trailing end of the slider. This configuration provides improved stability and reduces roll and yaw effects.

FIG. 3 depicts a trailing edge isometric view of the pressure profile observed with the implementation of the inventive slider described with reference to FIG. 1. For reference, the outer slider boundaries are at ambient pressure. The zones between the pressure peaks (36 and 44, and 34 and 42) have average pressures essentially equal to ambient, and relate to the side rail relieved zones 26 and 28 respectively. The two projecting positive pressure areas 34 and 36 relate generally to the trailing end surfaces 38 and 40 of the side rails 12 and 14, respectively, and the positive pressure areas 42 and 44 relate to the front portions 46 and 48 respectively of the side rails.

The configuration of this invention incorporating recesses in spaced rails at the air bearing surface of a self-loading air bearing head slider allows the magnetic head to respond quickly to changes in the surface topography of a rotating magnetic disk, and enables rapid lift-off from the disk surface when used in a disk drive with the feature of start and stop in contact between the head and the disk. By virtue of the novel slider configuration disclosed herein, it is possible to preserve high stiffness, and to achieve relative insensitivity to skew and disk curvature or flutter. A feature of the invention is that substantially the highest possible pitch stiffness is obtained by virtue of the concentrations of positive load near the leading the trailing edges of the bearing.

Having thus described my invention, what I claim as new, and desire to secure by Letters Patent is:

1. An air bearing head slider for supporting transducer elements comprising:
   a support structure having an air bearing surface and a longitudinal axis along said surface, and leading and trailing edges;
   side rails disposed along the side edges of said air bearing surface;
   a cross-rail disposed between said side rails;
   said side rails having relatively shallow recesses formed therein, for yielding substantially ambient pressure across the rails, whereby said slider is insensitive to skew and disk curvature.

2. An air bearing head slider as in claim 1, wherein said side rails and cross-rail define a first relatively deep recessed section disposed towards the trailing edge portion adjacent to one side of said cross rail, said first recessed section being closed on three sides by said rails.

3. An air bearing head slider as in claim 1, wherein said side rails and cross-rail define a second relatively deep recessed section disposed towards the leading edge portion adjacent to the other side of said cross-rail.

4. An air bearing head slider as in claim 1, wherein said first recessed section is at least twice in area than that of said second recessed section.

5. An air bearing head slider as in claim 1, wherein said side rails flare out so that the width of said side rails are greater at the trailing edge of said slider than at the leading edge.

6. An air bearing head slider as in claim 1, including tapered sections disposed at the leading edges of said side rails.

7. An air bearing head slider as in claim 1, wherein said shallow recesses in said side rails are less than half in depth than said first and second recessed sections.

* * * * *